US008327718B2

(12) United States Patent
Weinstein

(10) Patent No.: US 8,327,718 B2
(45) Date of Patent: *Dec. 11, 2012

(54) VERY LOW FREQUENCY VIBRATORY FLOW METER

(75) Inventor: Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 136 days.

This patent is subject to a terminal disclaimer.

(21) Appl. No.: 12/937,442

(22) PCT Filed: Apr. 29, 2009

(86) PCT No.: PCT/US2009/042018
§ 371 (c)(1),
(2), (4) Date: Oct. 12, 2010

(87) PCT Pub. No.: WO2009/134829
PCT Pub. Date: Nov. 5, 2009

(65) Prior Publication Data
US 2011/0023625 A1    Feb. 3, 2011

Related U.S. Application Data

(60) Provisional application No. 61/049,664, filed on May 1, 2008.

(51) Int. Cl.
*G01F 1/84* (2006.01)
(52) U.S. Cl. .................................. 73/861.356
(58) Field of Classification Search ............... 73/861.23, 73/861.357
See application file for complete search history.

(56) References Cited

U.S. PATENT DOCUMENTS

| | | | |
|---|---|---|---|
| 5,228,327 | A | 7/1993 | Bruck |
| 6,408,700 | B1 | 6/2002 | Matt et al. |
| 7,360,453 | B2 | 4/2008 | Rieder et al. |
| 7,412,903 | B2 | 8/2008 | Rieder et al. |
| 2004/0040387 | A1 | 3/2004 | Nakao et al. |
| 2007/0001028 | A1 | 1/2007 | Gysling |

FOREIGN PATENT DOCUMENTS

| | | |
|---|---|---|
| EP | 0733886 B1 | 8/2004 |
| RU | 2119149 C1 | 9/1998 |
| RU | 2297600 C2 | 4/2007 |
| WO | 0169040 A1 | 9/2001 |
| WO | 2004063741 A2 | 7/2004 |
| WO | 2006107297 A1 | 10/2006 |
| WO | 2007022118 A1 | 2/2007 |

OTHER PUBLICATIONS

U.S. Appl. No. 12/937,587 Weinstein, Oct. 13, 2010.*
U.S. Appl. No. 12/936,646, Weinstein Oct. 6, 2010.*

* cited by examiner

*Primary Examiner* — Jewel V Thompson
(74) *Attorney, Agent, or Firm* — The Ollila Law Group LLC

(57) ABSTRACT

A very low frequency vibratory flow meter (100) is provided. The very low frequency vibratory flow meter (100) includes a flow meter assembly (10) including one or more flow conduits (103A, 103B). The flow meter assembly (10) is configured to generate a very low frequency vibrational response that is below a predetermined minimum decoupling frequency for the flow fluid independent of a foreign material size or a foreign material composition. The very low frequency vibratory flow meter (100) further includes meter electronics (20) coupled to the flow meter assembly (10) and configured to receive the very low frequency vibrational response and generate one or more flow measurements therefrom.

46 Claims, 7 Drawing Sheets

VERY LOW FREQUENCY VIBRATORY FLOW METER

CROSS-REFERENCE TO RELATED APPLICATIONS

This is a National Stage entry of International Application No. PCT/US2009/042018, with an international filing date of Apr. 29, 2009, which claims priority of U.S. provisional patent application No. 61/049,664, filed May 1, 2008 entitled "METHOD AND APPARATUS FOR DETERMINING PARAMETERS IN A MULTIPHASE FLOW".

BACKGROUND OF THE INVENTION

1. Field of the Invention

The present invention relates to a vibratory flow meter, and more particularly, to a very low frequency vibratory flow meter.

2. Statement of the Problem

Vibratory flow meters, such as Coriolis mass flow meters and vibratory densitometers, typically operate by detecting motion of a vibrating conduit that contains a flowing or non-flowing fluid. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical vibratory flow meter includes one or more conduits that are connected inline in a pipeline or other transport system and convey material, e.g., fluids, slurries and the like, in the system. A conduit may be viewed as having a set of natural vibration modes, including for example, simple bending, torsional, radial, and coupled modes. In a typical measurement application, a conduit is excited in one or more vibration modes as a material flows through the conduit and motion of the conduit is measured at points spaced along the conduit. Excitation is typically provided by an actuator, e.g., an electromechanical device, such as a voice coil-type driver, that perturbs the conduit in a periodic fashion. Fluid density may be obtained by determining a resonant frequency of the flow fluid. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive a mass flow rate measurement.

Flow meters are used to perform mass flow rate and/or density measurements for a wide variety of fluid flows and offer high accuracy for single phase flows. One area in which vibratory flow meters are used is in the metering of oil and gas well outputs. The product of such wells can comprise a multi-phase flow, including liquids but also including gases and/or solids that can be entrained in the flow fluid. An oilfield flow fluid therefore can include oil, water, air or other gases, and/or sand or other soil particulates, for example. However, when a vibratory flow meter is used to measure flow fluids including entrained gases and/or solids, the accuracy of the meter can be significantly degraded. It is highly desirable that the resulting metering be as accurate as possible, even for such multi-phase flows.

The multi-phase flow fluids can include entrained gases, especially bubbly gas flows. The multi-phase flows can include entrained solids or entrained solid particles, mixtures such as concrete, etc. Further, multi-phase flows can include liquids of different densities, such as water and petroleum components, for example. The phases may have different densities, viscosities, or other properties.

In a multi-phase flow, the vibration of a flow conduit does not necessarily move the entrained gases/solids completely in phase with the flow fluid. This vibrational anomaly is referred to as decoupling or slippage. Gas bubbles, for example, can become decoupled from the flow fluid, affecting the vibrational response and any subsequently derived flow characteristics. Small bubbles typically move with the flow fluid as the flow meter is vibrated. However, larger bubbles do not move with the flow fluid during vibration of the flow conduit. Instead, the bubbles can be decoupled from the flow fluid and can move independently, with entrained gas bubbles moving farther and faster than the flow fluid during each vibrational movement. This adversely affects the vibrational response of the flowmeter. This is also true of solid particles entrained in the flow fluid, where the solid particles are increasingly likely to decouple from the motion of the flow fluid at increasing particle sizes or vibrational frequencies. The decoupling may even occur where the multi-phase flow includes liquids of differing densities and or viscosities. The decoupling action has been found to be affected by various factors, such as the viscosity of the flow fluid and the difference in density between the flow fluid and the foreign material, for example.

In addition to problems caused by the relative motion of bubbles and particles, Coriolis meters can experience accuracy degradation from speed of sound (SOS) or compressibility effects when the sonic velocity of the measurement fluid is low or the oscillation frequency of the meter is high. Liquids have higher sonic velocities than gases, but the lowest velocities result from a mixture of the two. Even a small amount of gas entrained in a liquid results in a dramatic reduction in the speed of sound of the mixture; below that of either phase.

The oscillation of the flow tube produces sound waves that oscillate in the transverse direction at the drive frequency of the meter. When the speed of sound of the fluid is high, as in a single phase fluid, the first acoustic mode for transverse sound waves across the circular conduit is at a much higher frequency than the drive frequency. However, when the speed of sound drops due to the addition of gas to a liquid, the frequency of the acoustic mode also drops. When the frequency of the acoustic mode and the drive mode are close, meter errors result due to the off-resonance excitation of the acoustic mode by the drive mode.

For low frequency meters and typical process pressures, velocity of sound effects are present in multiphase flows but are usually negligible with respect to the specified accuracy of the meter. However, for high frequency Coriolis meters operating at low pressures with bubbly fluids, the velocity of sound can be low enough to cause significant measurement errors due to interaction between the drive and fluid vibration modes.

The size of the bubbles can vary, depending on the amount of gas present, the pressure of the flow fluid, temperature, and the degree of mixing of the gas into the flow fluid. The extent of the decrease in performance is not only related to how much total gas is present, but also to the size of the individual gas bubbles in the flow. The size of the bubbles affects the accuracy of the measurement. Larger bubbles occupy more volume and decouple to a further extent, leading to fluctuations in the density and measured density of the flow fluid. Due to the compressibility of a gas, the bubbles can change in gas amount, or mass, yet not necessarily change in size. Conversely, if the pressure changes, the bubble size can correspondingly change, expanding as the pressure drops or shrinking as the pressure increases. This can also cause variations in the natural or resonant frequency of the flow meter.

Prior art vibratory flow meters are typically designed for operating frequencies around 100 to 300 Hertz (Hz). Some prior art meters are designed to operate at much higher frequencies. The operating frequency in a prior art vibratory flow meter is typically chosen in order to facilitate the flow meter design, production, and operation. For example, a prior art vibratory flow meter is configured to be physically compact and substantially uniform in dimensions. For example, a height of a prior art flow meter is typically less than the length, giving a low height-to-length aspect ratio (H/L) and a corresponding high drive frequency. Flow meter users prefer a small overall size so that installation is simplified. Further, flow meter design commonly assumes a uniform, single-phase fluid flow and is designed to optimally operate with such a uniform flow fluid.

In the prior art, flow meters typically have a low height-to-length aspect ratio (H/L). A straight conduit flow meter has a height-to-length aspect ratio of zero, which typically produces a high drive frequency. Bowed flow conduits are often used to keep the length from being the dominant dimension and will increase the height-to-length aspect ratio (H/L). However, prior art flow meters are not designed with high aspect ratios. A curved or bowed conduit flow meter in the prior art may have a height-to-length aspect ratio approaching 1.3, for example.

There remains a need in the art for a vibratory flow meter that is capable of accurately and reliably measuring multi-phase flow fluids.

ASPECTS OF THE INVENTION

In one aspect of the invention, a very low frequency vibratory flow meter comprises:
- a flow meter assembly including one or more flow conduits, with the flow meter assembly being configured to generate a very low frequency vibrational response that is below a predetermined minimum decoupling frequency for the flow fluid independent of a foreign material size or a foreign material composition; and
- meter electronics coupled to the flow meter assembly and configured to receive the very low frequency vibrational response and generate one or more flow measurements therefrom.

Preferably, the very low frequency vibrational response is below a predetermined minimum SOS/compressibility threshold independent of a foreign material size or a foreign material composition.

Preferably, the meter electronics is configured such that a decoupling ratio $(A_p/A_f)$ is about 1:1 for entrained solids or entrained gas at the very low frequency.

Preferably, the meter electronics is configured such that a viscosity is effectively infinity with regard to particle motion for the flow fluid at the very low frequency.

Preferably, the very low frequency vibrational response is below about 5 Hertz (Hz).

Preferably, the very low frequency vibrational response is below about 50 Hertz (Hz).

Preferably, the very low frequency vibrational response corresponds to an inverse Stokes number ($\delta$) that is above about 3.5.

Preferably, the one or more flow conduits are configured to vibrate at a very high vibrational response amplitude.

Preferably, the one or more flow conduits are configured to vibrate at a vibrational response amplitude of greater than about one millimeter (mm).

Preferably, the one or more flow conduits are configured to vibrate at a vibrational response amplitude of greater than about five millimeters (mm).

Preferably, the one or more flow conduits are configured to achieve the very low frequency vibrational response by configuration of one or more of a flow conduit stiffness, flow conduit length, flow conduit aspect ratio, flow conduit material, flow conduit thickness, flow conduit shape, flow conduit geometry, or one or more vibrational node positions.

Preferably, the very low frequency vibratory flow meter is excited off-resonance at a predetermined low frequency and an off-resonance mass flow measurement is obtained, wherein the off-resonance mass flow measurement is substantially immune to decoupling and SOS effects.

Preferably, the predetermined low frequency is chosen to correspond to an inverse Stokes number ($\delta$) greater than a threshold value selected to substantially eliminate multi-phase errors.

Preferably, the off-resonance mass flow measurement is compared with a resonance mass flow measurement obtained at a resonant frequency and if the off-resonance mass flow measurement and the resonance mass flow measurement differ by more than a predetermined decoupling range, a multi-phase indication is generated.

Preferably, the very low frequency vibratory flow meter is excited off-resonance at multiple predetermined off-resonance frequencies and multiple corresponding off-resonance mass flow measurements are obtained, wherein the multiple off-resonance mass flow measurements are compared to determine whether a multi-phase flow exists and to determine a multi-phase error magnitude.

In one aspect of the invention, a method of operating a very low frequency vibratory flow meter comprises:
- vibrating one or more flow conduits of the very low frequency vibratory flow meter at a very low frequency that is below a predetermined minimum decoupling frequency for the flow fluid independent of a foreign material size or a foreign material composition;
- receiving a very low frequency vibrational response; and
- generating one or more flow measurements from the very low frequency vibrational response.

Preferably, the very low frequency vibrational response is below a predetermined minimum SOS/compressibility threshold independent of a foreign material size or a foreign material composition.

Preferably, the very low frequency flow meter is configured such that a decoupling ratio $(A_p/A_f)$ is about 1:1 for entrained solids or entrained gas at the very low frequency.

Preferably, the very low frequency vibratory flow meter is configured such that a viscosity is effectively infinity with regard to particle motion for the flow fluid at the very low frequency.

Preferably, the very low frequency vibrational response is below about 5 Hertz (Hz).

Preferably, the very low frequency vibrational response is below about 50 Hertz (Hz).

Preferably, the very low frequency vibrational response corresponds to an inverse Stokes number ($\delta$) that is above about 3.5.

Preferably, the one or more flow conduits are configured to vibrate at a very high vibrational response amplitude.

Preferably, the one or more flow conduits are configured to vibrate at a vibrational response amplitude of greater than about one millimeter (mm).

Preferably, the one or more flow conduits are configured to vibrate at a vibrational response amplitude of greater than about five millimeters (mm).

Preferably, the one or more flow conduits are configured to achieve the very low frequency vibrational response by configuration of one or more of a flow conduit stiffness, flow conduit length, flow conduit aspect ratio, flow conduit material, flow conduit thickness, flow conduit shape, flow conduit geometry, or one or more vibrational node positions.

Preferably, the very low frequency vibratory flow meter is excited off-resonance at a predetermined low frequency and an off-resonance mass flow measurement is obtained, wherein the off-resonance mass flow measurement is substantially immune to decoupling and SOS effects.

Preferably, the predetermined low frequency is chosen to correspond to an inverse Stokes number ($\delta$) greater than a threshold value selected to substantially eliminate multi-phase errors.

Preferably, the off-resonance mass flow measurement is compared with a resonance mass flow measurement obtained at a resonant frequency and if the off-resonance mass flow measurement and the resonance mass flow measurement differ by more than a predetermined decoupling range, a multi-phase indication is generated.

Preferably, the very low frequency vibratory flow meter is excited off-resonance at multiple predetermined off-resonance frequencies and multiple corresponding off-resonance mass flow measurements are obtained, wherein the multiple off-resonance mass flow measurements are compared to determine whether a multi-phase flow exists and to determine a multi-phase error magnitude.

In one aspect of the invention, a method of forming a very low frequency vibratory flow meter comprises:
- determining a predetermined very low operating frequency for the very low frequency vibratory flow meter based on at least an expected flow fluid, wherein the very low operating frequency is below a predetermined minimum decoupling frequency for the flow fluid independent of a foreign material size or a foreign material composition;
- selecting one or more flow conduit design characteristics based on the predetermined very low operating frequency, with the one or more flow conduit design characteristics being selected to substantially achieve the predetermined very low operating frequency; and
- constructing the very low frequency vibratory flow meter employing the selected one or more flow conduit design characteristics, or by driving off resonance directly at the desired low frequency.

Preferably, the very low frequency vibrational response is below a predetermined minimum SOS/compressibility threshold independent of a foreign material size or a foreign material composition.

Preferably, the flow meter is configured such that a decoupling ratio ($A_p/A_f$) is about 1:1 for entrained solids or entrained gas at the very low frequency.

Preferably, the flow meter is configured such that a viscosity is effectively infinity with regard to particle motion for the flow fluid at the very low frequency.

Preferably, the very low frequency vibrational response is below about 5 Hertz (Hz).

Preferably, the very low frequency vibrational response is below about 50 Hertz (Hz).

Preferably, the very low frequency vibrational response corresponds to an inverse Stokes number ($\delta$) that is above about 3.5.

Preferably, the one or more flow conduits are configured to vibrate at a very high vibrational response amplitude.

Preferably, the one or more flow conduits are configured to vibrate at a vibrational response amplitude of greater than about one millimeter (mm).

Preferably, the one or more flow conduits are configured to vibrate at a vibrational response amplitude of greater than about five millimeters (mm).

Preferably, the one or more flow conduits are configured to achieve the very low frequency vibrational response by configuration of one or more of a flow conduit stiffness, flow conduit length, flow conduit aspect ratio, flow conduit material, flow conduit thickness, flow conduit shape, flow conduit geometry, or one or more vibrational node positions.

Preferably, the very low frequency vibratory flow meter is excited off-resonance at a predetermined low frequency and an off-resonance mass flow measurement is obtained, wherein the off-resonance mass flow measurement is substantially immune to decoupling and SOS effects.

Preferably, the predetermined low frequency is chosen to correspond to an inverse Stokes number ($\delta$) greater than a threshold value selected to substantially eliminate multi-phase errors.

Preferably, the off-resonance mass flow measurement is compared with a resonance mass flow measurement obtained at a resonant frequency and if the off-resonance mass flow measurement and the resonance mass flow measurement differ by more than a predetermined decoupling range, a multi-phase indication is generated.

Preferably, the very low frequency vibratory flow meter is excited off-resonance at multiple predetermined off-resonance frequencies and multiple corresponding off-resonance mass flow measurements are obtained, wherein the multiple off-resonance mass flow measurements are compared to determine whether a multi-phase flow exists and to determine a multi-phase error magnitude.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
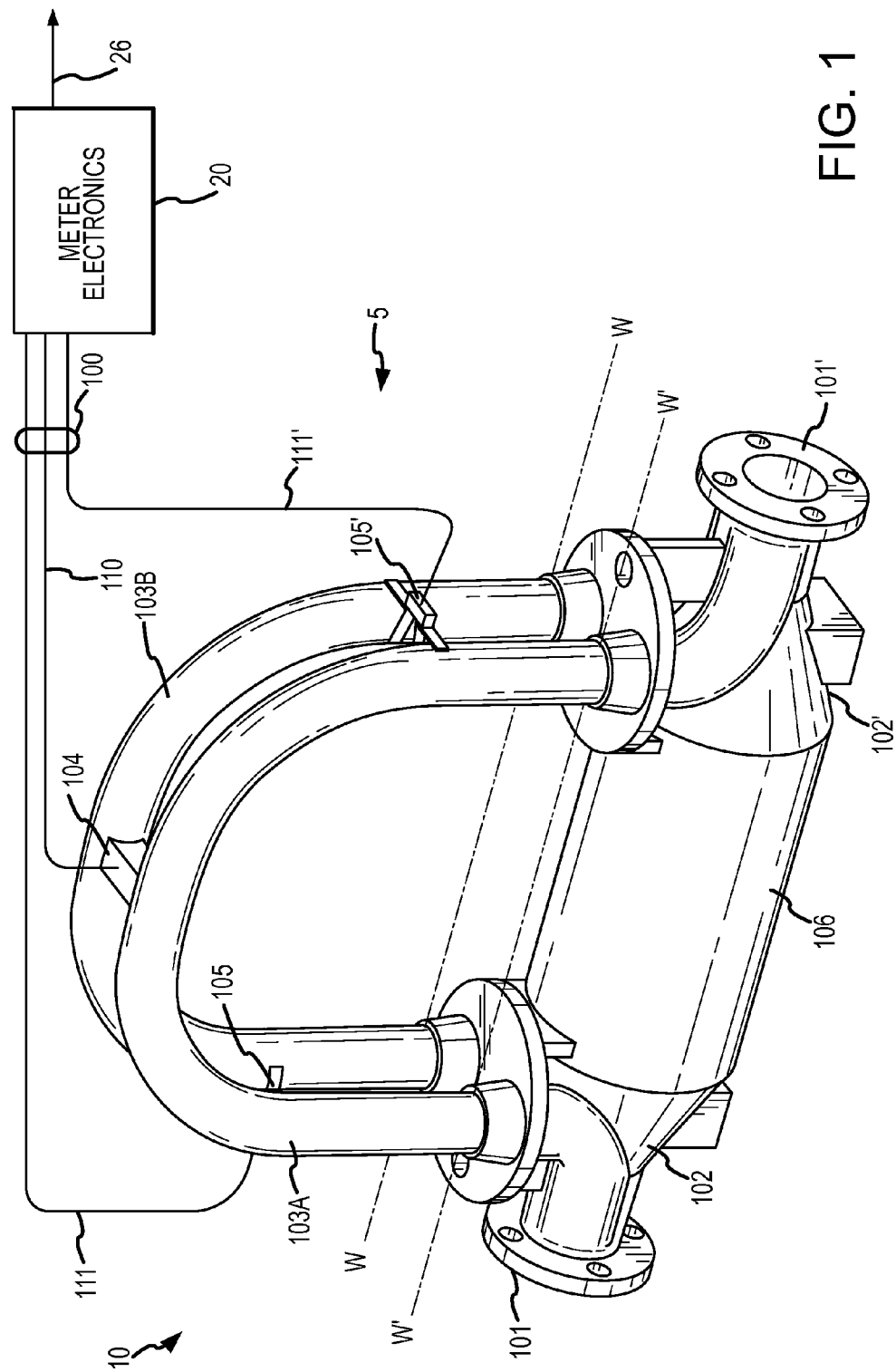
FIG. 1 shows a very low frequency vibratory flow meter according to the invention.

FIG. 1 shows a very low frequency vibratory flow meter 5 according to the invention. The very low frequency vibratory flow meter 5 in one embodiment comprises a Coriolis flowmeter. In another embodiment, the very low frequency vibratory flow meter 5 comprises a vibrating densitometer.

The very low frequency vibratory flow meter 5 is designed to measure fluid characteristics of a flow fluid, including measuring either a flowing or stationary flow fluid. The very low frequency vibratory flow meter 5 is further designed to accurately and reliably measure the flow fluid when the flow fluid comprises multiple phases. The multi-phase flow fluid can include entrained gas in some embodiments, wherein the entrained gas can comprise a bubbly flow. The entrained gas can include air bubbles or bubbles of various sizes. Entrained gas is problematic in prior art vibratory flow meters. The entrained gas, especially for moderate to large bubbles, can move independently of the flow fluid and cause measurement errors or uncertainties. In addition, the entrained gas can cause varying measurement effects due to compressibility of the gas varying with the operating pressure of the flow fluid.

The multi-phase flow fluid can include entrained solids in some embodiments, wherein the entrained solids can comprise a slurry. One example comprises sand or soil particles in a petroleum flow. The entrained solids can move independently of the flow fluid and cause measurement errors and/or uncertainties.

In some embodiments, the multi-phase flow can include differing liquids, such as immiscible liquids that cannot be mixed together. For example, the flow fluid can include both water and oil. Where the fluid flow components have differing densities, the fluid flow components may experience some decoupling during flow meter vibration. The entrained liquid can be less dense than the bulk fluid. The entrained liquid can be denser than the bulk fluid.

The very low frequency vibratory flow meter 5 includes a flow meter assembly 10 and meter electronics 20. The meter electronics 20 is connected to the meter assembly 10 via leads 100 and is configured to provide measurements of one or more of a density, mass flow rate, volume flow rate, totalized mass flow, temperature, and other information over a communication path 26. It should be apparent to those skilled in the art that the present invention can be used in any type of vibratory flow meter regardless of the number of drivers, pick-off sensors, flow conduits, or the operating mode of vibration. It should be recognized that the flow meter 5 can comprise a vibratory densitometer and/or a Coriolis mass flow meter.

The flow meter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

In one embodiment, the flow conduits 103A and 103B comprise substantially U-shaped flow conduits, as shown. Alternatively, in other embodiments, the flow conduits can comprise substantially straight flow conduits. However, other shapes can also be used and are within the scope of the description and claims.

The flanges 101 and 101' are affixed to the manifolds 102 and 102'. The manifolds 102 and 102' can be affixed to opposite ends of a spacer 106. The spacer 106 maintains the spacing between the manifolds 102 and 102' in order to prevent undesired vibrations in the flow conduits 103A and 103B. When the flow meter assembly 10 is inserted into a conduit system (not shown) which carries the flow fluid being measured, the flow fluid enters the flow meter assembly 10 through the flange 101, passes through the inlet manifold 102 where the total amount of flow fluid is directed to enter the flow conduits 103A and 103B, flows through the flow conduits 103A and 103B and back into the outlet manifold 102', where it exits the meter assembly 10 through the flange 101'.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the flow meter 5. However, the flow conduits 103A and 103B can alternatively be vibrated at a second out of phase bending mode or higher, if desired. This may be done for calibration or testing activities, fluid viscosity tests, or for obtaining measurement values at different vibrational frequencies. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110.

The meter electronics 20 receives sensor signals on the leads 111 and 111', respectively. The meter electronics 20 produces a drive signal on the lead 110 which causes the driver 104 to oscillate the flow conduits 103A and 103B. The meter electronics 20 processes the left and right velocity signals from the pick-off sensors 105 and 105' in order to compute a mass flow rate. The communication path 26 provides an input and an output means that allows the meter electronics 20 to interface with an operator or with other electronic systems. The description of FIG. 1 is provided merely as an example of the operation of a vibratory flow meter and is not intended to limit the teaching of the present invention.

In operation, the very low frequency vibratory flow meter 5 is vibrated at a very low frequency. The very low frequency can comprise a first bending mode vibration. However, other vibrational modes are contemplated and are within the scope of the description and claims.

For example, in some embodiments the flow meter assembly 10 can be driven off resonance at a predetermined low frequency, wherein the mass flow rate (and/or other flow characteristics) are subsequently measured. The predetermined low frequency can be less than the resonant frequency. The resulting mass flow measurement will be substantially immune to decoupling and SOS effects and can be determined through phase measurement at the predetermined low frequency. The predetermined low frequency can be chosen to correspond to an inverse Stokes number ($\delta$) greater than a threshold value selected to substantially eliminate multi-phase errors. Density measurement is not possible due to the fact that the frequency has been specifically chosen rather than measured. The challenge of this type of operation is that the response amplitude of the conduit will be small due to the off-resonant vibration. However, this challenge can be overcome by inputting additional drive power or by averaging phase measurements to help reject noise.

In addition, the flow meter 5 can be vibrated at a very high amplitude. In some embodiments, the flow meter 5 can be vibrated simultaneously at a very low frequency and at a very high amplitude. The flow fluid can be either stationary or flowing, as previously discussed. As a result, the very low frequency vibratory flow meter 5 produces a very low frequency vibrational response. The very low frequency vibrational response is processed in order to determine one or both of a response frequency and a response amplitude. The response frequency and/or a response amplitude can be used to determine one or more flow fluid characteristics, including a mass flow rate, density, viscosity, et cetera. The very low frequency nature of the flow meter 5 is discussed further below.

An advantage of the very low frequency vibratory flow meter 5 is that the flow meter 5 in some embodiments can be operated at higher frequencies, if desired. This may be done where no multi-phase flow is expected. For example, if the flow meter 5 is installed downstream of a separator device, then the flow fluid may be acceptably uniform and free of entrained foreign material. In such a situation, the flow meter 5 may be operated at higher frequencies, such as at a second, third, or fourth bending mode, et cetera, where the higher order bending modes comprise multiples or harmonics of the meter resonant frequency, for example.

In some embodiments, the very low frequency vibratory flow meter 100 can be operated at multiple vibrational frequencies. The multiple vibrational frequencies can include vibrating the flow meter assembly 10 at alternating frequencies or at different frequencies at different times. Alternatively, the flow meter assembly 10 can be simultaneously vibrated at multiple vibrational frequencies.

For example, the very low frequency vibratory flow meter 100 can operate at a resonance frequency and obtain resonance mass flow and density measurements and can operate off-resonance and obtain one or more off-resonance mass flow measurements. Subsequently, the one or more off-resonance mass flow measurements can be compared with the resonance mass flow measurement. If the one or more off-resonance mass flow measurements and the resonance mass flow measurement differ by more than a predetermined decoupling range, a multi-phase indication can be generated.

Further, multiple off-resonance mass flow measurements can be compared to determine whether a multi-phase flow exists and to determine a multi-phase error magnitude. Consequently, if off-resonance mass flow measurements at 10, 20 and 30 Hz are substantially identical, but an off-resonance mass flow measurement at 40 Hz significantly deviates from the previous measurements, then it can be determined that multi-phase errors are occurring somewhere above the 30 Hz vibrational frequency.

The drive frequency is the frequency at which the one or more flow conduits 103A and 103B are vibrated in order to measure flow characteristics of the flow fluid. The drive frequency can be selected to be at a flow fluid resonant frequency, for example. Therefore, the drive frequency can differ from a vibrational response frequency and can vary according to the makeup of the flow fluid. In addition, the drive frequency is affected by the stiffness characteristic of the flowmeter. As the stiffness characteristic increases, the drive frequency will increase. As a result, lowering the flow conduit stiffness will result in a lower flow conduit resonant frequency and a decreased flow meter frequency. The flow conduit stiffness can be changed in a variety of ways, as discussed below.

A consequence of a multi-phase flow fluid is that accurate fluid measurements are affected and impeded during such multi-phase periods. The multi-phase effects may be present even in the presence of moderate to mild multi-phase flow conditions. The nature of the multi-phase flow fluid can manifest in compressibility/speed of sound (SOS) effects and in decoupling effects between components of the multi-phase flow fluid. The two effects can be controlled or eliminated by proper selection of vibrational frequency and amplitude.

The multi-phase flow fluids can include entrained gases, especially bubbly gas flows. The multi-phase flows can include entrained solids or entrained solid particles, mixtures such as concrete, slurries, etc. Further, multi-phase flows can include liquids of different densities, such as water and petroleum components, for example. The phases may have different densities or viscosities.

In a multi-phase flow, the vibration of a flow conduit does not necessarily move the entrained gases/solids completely in phase with the flow fluid. This vibrational anomaly is referred to as decoupling or slippage. Gas bubbles, for example, can become decoupled from the flow fluid, affecting the vibrational response and any subsequently derived flow characteristics. Small bubbles typically move with the flow fluid as the flow meter is vibrated. However, larger bubbles do not move with the flow fluid during vibration of the flow conduit. Instead, the bubbles can be decoupled from the flow fluid and can move independently, with entrained gas bubbles moving farther and faster than the flow fluid during each vibrational movement. This adversely affects the vibrational response of the flowmeter. This is also true of solid particles entrained in the flow fluid, where the solid particles are increasingly likely to decouple from the motion of the flow fluid at increasing vibrational frequencies. The decoupling may even occur where the multi-phase flow includes liquids of differing densities and/or viscosities. The decoupling action has been found to be affected by various factors, such as the viscosity of the flow fluid and the difference in density between the flow fluid and the foreign material, for example.

The size of the bubbles can vary, depending on the amount of gas present, the pressure of the flow fluid, temperature, the degree of mixing of the gas into the flow fluid, and other flow properties. The extent of the decrease in performance is not only related to how much total gas is present, but also to the size of the individual gas bubbles in the flow. The size of the bubbles affects the accuracy of the measurement. Larger bubbles occupy more volume, leading to fluctuations in the density and measured density of the flow fluid. Due to the compressibility of a gas, the bubbles can change in mass yet not necessarily change in size. Conversely, if the pressure changes, the bubble size can correspondingly change, expanding as the pressure drops or shrinking as the pressure increases. This can also cause variations in the natural or resonant frequency of the flow meter.

In a vibrating conduit, the acceleration of the vibrating conduit causes the bubbles to move. The conduit acceleration is determined by the vibrational frequency and the vibrational amplitude. In the case of entrained gas, the bubbles are accelerated in the same direction as the conduit acceleration. The bubbles move faster and further than the flow conduit. The faster bubble motion (and the resulting fluid displacement) causes some of the fluid to move more slowly than the flow conduit, causing a net shift in the center of gravity of the fluid mixture away from the center of the vibrating conduit. This is the basis of the decoupling problem. As a result, flow rate and density characteristics are under-reported (negative flow and density errors) when entrained air is present.

Slurries present a similar problem. In the case of slurries, however, the solid particles are often heavier than the liquid component. Under the acceleration of the vibrating conduit, the heavier particles move less than the liquid. But because the heavy particles move less, the center of gravity of the fluid mixture still moves slightly backwards from the center of the conduit. This again results in negative flow and density errors.

In the gas-liquid, solid-liquid, and liquid-liquid cases, the differential motion of the entrained phase is driven by the difference in density between the entrained phase and the liquid component. If the compressibility of the gas is neglected, then the same equations can be used to describe the behavior of all three scenarios.

Compensating for fluid decoupling has been difficult because there are several factors that determine how much the bubbles move with respect to the fluid. Fluid viscosity is an obvious factor. In a very viscous fluid, bubbles (or particles) are effectively frozen in place in the fluid and little flow error results. At a very low vibrational frequency, the flow fluid will act as a very viscous fluid, i.e., as if the viscosity is infinite. At a very high vibrational frequency, the flow fluid will act as a non-viscous fluid, i.e., as if the viscosity is approximately zero (i.e., the inviscid case).

Viscosity is a measure of the resistance of a fluid which is being deformed by either shear stress or extensional stress. In general, it is the resistance of a liquid to flow, a quantification of the fluid's thickness. Viscosity may be thought of as a measure of fluid friction. All real fluids have some resistance to stress, but a fluid which has no resistance to shear stress is known as an ideal fluid or inviscid fluid.

Another influence on bubble mobility is the bubble size. The drag on a bubble is proportional to the surface area, whereas the buoyant force is proportional to the volume. Therefore, very small bubbles have a high drag to buoyancy ratio and tend to move with the fluid. Small bubbles subsequently cause small errors. Conversely, large bubbles tend to not move with the fluid and result in large errors. The same holds true for solid particles, as small particles tend to move with the fluid and only cause small errors.

Another problem caused by vibration is speed of sound (SOS) or compressibility effects. These effects make mass flow and density measurements increasingly inaccurate for gassy flows as the vibrational frequency increases.

The density difference is another factor. A buoyant force is proportional to the difference in density between the fluid and the gas. A high pressure gas can have a high enough density to affect the buoyant force and reduce the decoupling effect. In addition, large bubbles occupy more volume, leading to true fluctuations in the density of the flow fluid. Due to the compressibility of a gas, the bubbles can change in gas quantity and yet not necessarily change in size. Conversely, if the pressure changes, the bubble size can correspondingly change, expanding as the pressure drops or shrinking as the pressure increases. This can also cause variations in the natural or resonant frequency of the flow meter and thus variations in the actual two-phase density.

Second order factors also can have an effect on bubble and particle mobility. The turbulence in a high flow rate fluid can break large gas bubbles into smaller ones, thus reducing decoupling error. Surfactants reduce the surface tension of bubbles and decrease their tendency to coalesce. Valves can decrease bubble size through increased turbulence while pipeline elbows can increase bubble size by forcing them together through centrifugal force.

In some embodiments, the very low frequency and high amplitude capabilities of the very low frequency vibratory flow meter 5 can be achieved through appropriate design parameters (or in combination with other factors, such as operational frequency). The basic consideration in producing the very low frequency vibratory flow meter 5 is that the meter's effective bending mode stiffness must be decreased in order to reduce the resonant (or natural) frequency. This may be accompanied by a reduction or increase in conduit amplitude. The reduction of the meter stiffness can be achieved in any manner and it is not important how the meter stiffness reduction is accomplished. However, several likely ways are discussed below.

A factor in meter stiffness is a flow conduit length. The flow meter length is substantially correlated to meter stiffness, wherein increasing the meter length will translate to some decrease in meter stiffness and operational frequency. Consequently, the flow meter length can be chosen in order to achieve at least some meter stiffness reduction.

A factor in meter stiffness is a flow conduit aspect ratio. For purposes of this discussion, the flow meter aspect ratio is defined as a flow meter height (H) divided by the flow meter length (L), where the aspect ratio=(H/L) (see FIG. 2). Where the height (H) is less than the length (L), the height-to-length aspect ratio (H/L) will be less than one. Where the flow meter is a straight flow meter, the height-to-length aspect ratio (H/L) will be effectively zero. Where the height (H) is greater than the length (L), the height-to-length aspect ratio (H/L) will be greater than one. For example, in the flow meter 5 of FIG. 2, the height-to-length aspect ratio (H/L) will be significantly larger than one and can reach a relatively high number. As a consequence, the height-to-length aspect ratio (H/L) can be increased in order to reduce meter stiffness and reduce the meter's resonant/operating frequency.

A factor in meter stiffness is a flow conduit material. The flow conduit material can be selected in order to reduce meter stiffness and reduce the frequency.

A factor in meter stiffness is flow conduit thickness. The flow conduit thickness can be reduced in order to reduce meter stiffness. However, as a practical matter, substantial reductions in flow conduit thickness can result in a reduced pressure capability and in an inadequate durability or ruggedness.

A factor in meter stiffness is a flow conduit shape. The flow conduit shape can be modified in any desirable fashion, including using conduits of substantially round, elliptical, rectangular, irregular, or other suitable shapes.

A factor in meter stiffness is a flow conduit geometry. The flow conduit geometry can be affected in any desirable fashion, including the use of appropriate straight and curved sections, for example. For example, a U-shaped flow conduit has a lesser stiffness than a straight conduit flow meter of the same length and type.

A factor in meter frequency is a flow conduit mass. The resonant frequency of the flow meter assembly 10 will drop as the flow conduit mass is increased, with all other factors being unchanged. The flow conduit mass can be increased in any fashion. For example, flow conduit mass can be increased through the addition of counterweights or other masses, for example. Adding mass at a discrete point or location will decrease the operational frequency without increasing flow conduit stiffness.

Figure 6:
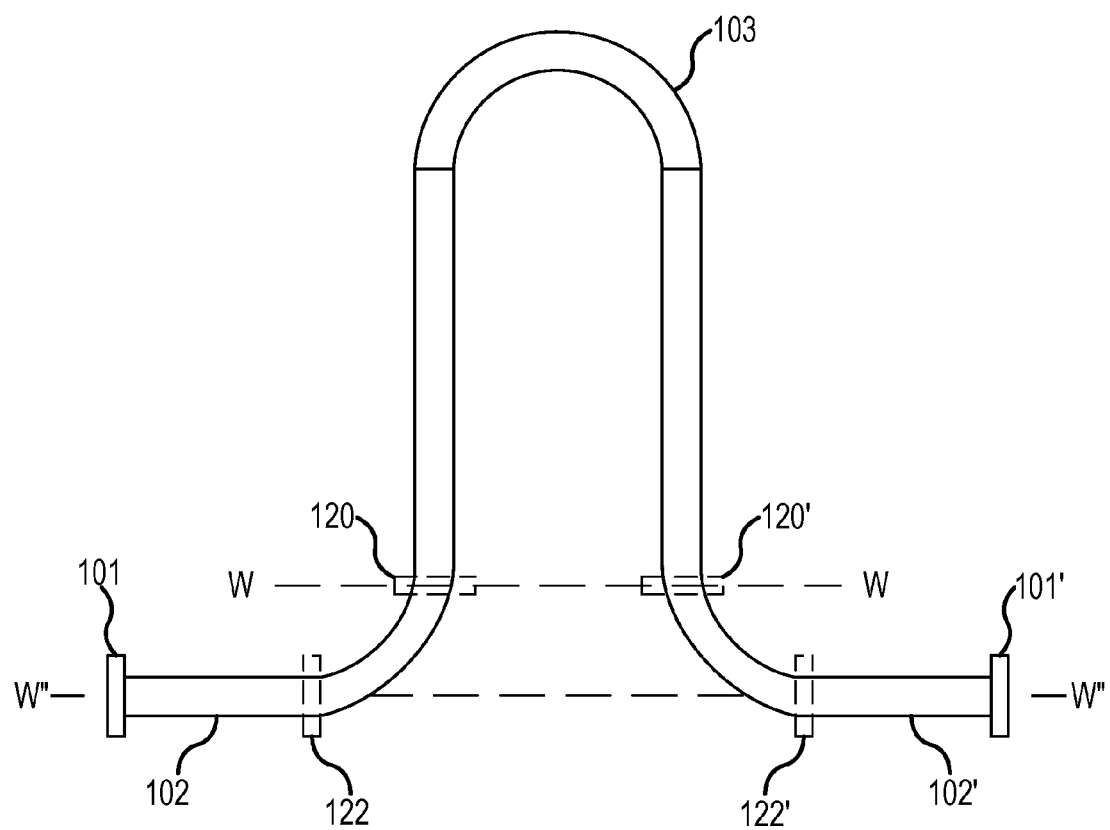
FIG. 6 shows a portion of the very low frequency vibratory flow meter according to the invention.

A factor in meter stiffness is a flow conduit nodal restrictor and vibrational node locations. The flow meter assembly 10 can include one or more nodal restrictors that control a vibration node position and bending axis and therefore affect the vibrational response. A common nodal restrictor in the embodiment shown comprises the spacer 106 in combination with the manifolds 102 and 102'. Alternatively, in other embodiments the nodal restrictor can comprise one or more brace bars that extend rigidly between the two flow conduits at a defined point substantially near to the flanges 101 and 101' (i.e., substantially at the two ends of the flow meter 5). Other node positions are shown in FIG. 6. The one or more nodal restrictors are included in order to fix the vibrational nodes of the curved flow conduits 103A and 103B, creating desired bending axes. The one or more nodal restrictors can be positioned (or removed) in order to increase the length of the flow conduits that experience the vibration and reduce the frequency. In FIG. 6, the torsion of sections 102 and 102' also reduces bending mode stiffness and thus reduces frequency.

As a result of careful meter design, the very low frequency vibratory flow meter 5 can be operated at very low frequencies. The very low frequency operation will result in a gas decoupling or a solids decoupling being maintained at about a decoupling ratio of 1:1, where the foreign material in the multi-phase flow fluid moves substantially with the flow fluid. In addition, the very low frequency operation will result in flow characteristics similar to a flow in which the viscosity is very high. This is true whether the foreign material comprises gas, liquid, or solid components. This is true whether the foreign material is of a moderately different density than the flow fluid or whether the foreign material has a greatly differing density. As a consequence, the entrained foreign material will not substantially affect the measurements performed by the very low frequency vibratory flow meter 5 and the very low frequency vibratory flow meter 5 will produce satisfactorily accurate and reliable measurements. Further, the very low frequency vibratory flow meter 5 will be substantially immune to variations in gas void fraction (GVF) and/or solids fraction, being able to satisfactorily measure the flow fluid even as the composition of the multi-phase flow fluid varies. Further, by operating the very low frequency vibratory flow meter 5 at a very low frequency, no compressibility effects will be encountered because transverse acoustic modes appear at much higher frequencies.

The meter electronics 20 generates a drive signal to the drive 104 and so can be configured to drive/vibrate the flow meter assembly 10 at the very low frequency. As is common practice in vibratory flow meters, this entails the meter electronics 20 generating a drive signal of a predetermined frequency and amplitude, wherein the predetermined frequency and amplitude can be affected and modified by feedback taken from the pickoff signals. For example, the drive signal can be controlled according to the feedback in order to achieve a resonant (i.e., natural) frequency in the vibrational response as measured by the pickoff sensors 105 and 105'.

The meter electronics 20 can be configured to generate the very low frequency in various ways. The very high amplitude may be a consequence of the very low frequency or can result from a drive signal amplitude. The meter electronics 20 can be configured during manufacture, such as by appropriately programming a memory of the meter electronics 20. Alternatively, the meter electronics 20 can be configured with the very low frequency during a calibration process, for example, where the very low frequency programming in some embodiments may depend on the measured or determined meter stiffness as determined by the calibration process. In another alternative, the very low frequency can be derived or determined during a meter start-up operation. For example, the very low frequency can be based on pre-stored or user entered values. This may include, for example, a very low frequency that is based on pre-stored or user-entered information regarding the nature of the multi-phase flow fluid.

Figure 2:
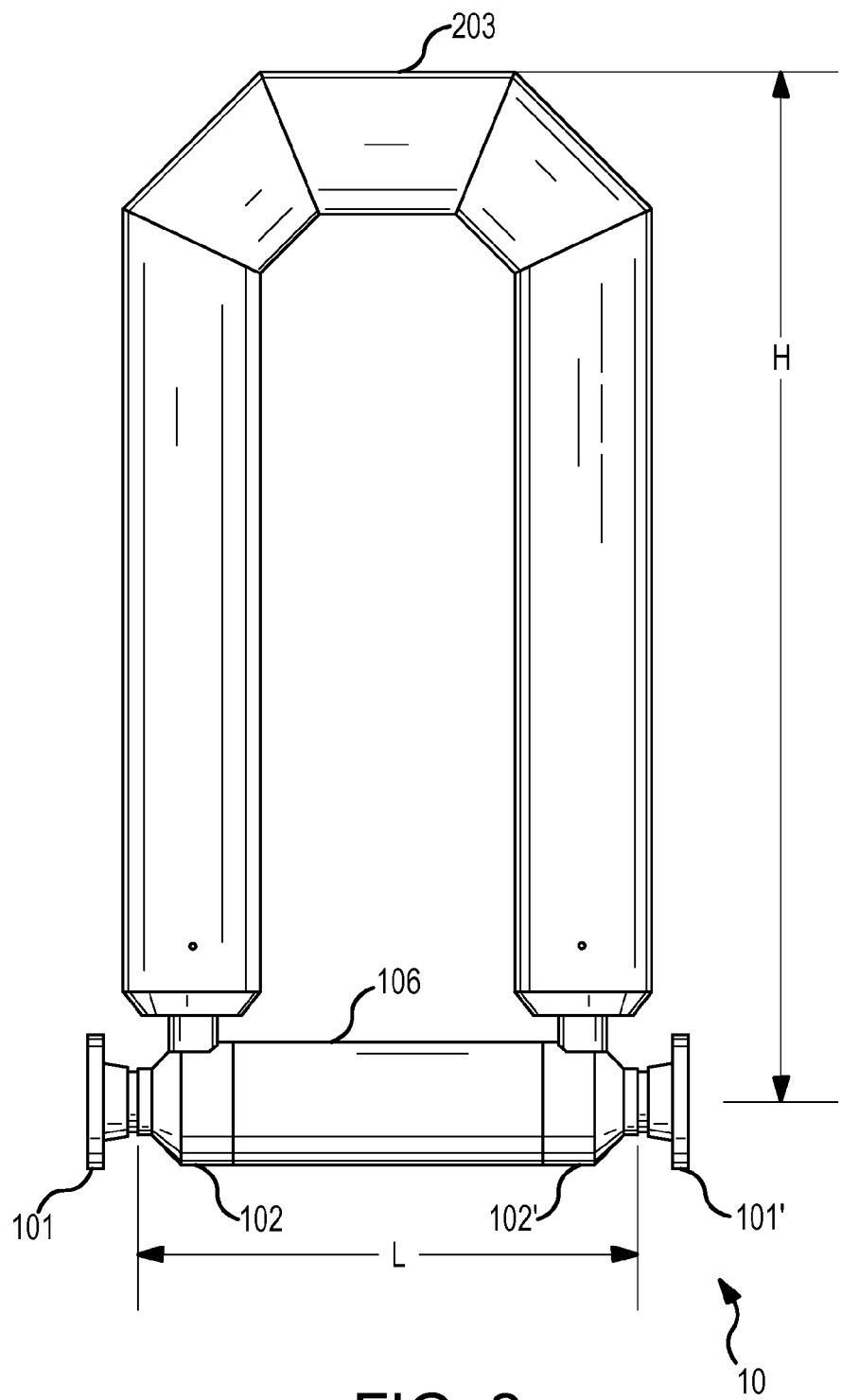
FIG. 2 shows the very low frequency vibratory flow meter according to an embodiment of the invention.

FIG. 2 shows the very low frequency vibratory flow meter 5 according to an embodiment of the invention. The flow conduits 103A and 103B can be within in a casing 203, as shown. The casing 203 can protect the flow conduits 103A and 103B and can further function to contain leakage in the event of a flow conduit fault or failure. The very low frequency vibratory flow meter 5 includes a height H and a length L. It can be seen from the figure that the height H in this embodiment is significantly greater than the meter length L. The height-to-length aspect ratio (H/L) is the ratio of these two meter characteristics. The height-to-length aspect ratio (H/L) may be increased in order to reduce the very low operating frequency. The height-to-length aspect ratio (H/L) may be increased to any needed number, including a number much larger than one, for example. The height-to-length aspect ratio (H/L) may be even higher, such as an aspect ratio approaching a value of 4 or 5, for example, or higher.

In one embodiment, the meter overall length L is substantially the distance between the flanges 101 and 101' of the flow meter 5, while the meter overall height H is substantially the distance between a centerline of the inlet/outlet manifolds 102 and 102' and the farthest away centerline (i.e., the center of the peak of the bowed portion). The aspect ratio is therefore an approximate quantification of the overall shape and size of the flow meter 5. A high aspect ratio (H/L) according to this definition connotes that the flow meter has a large height H compared to its length L.

Figure 3:
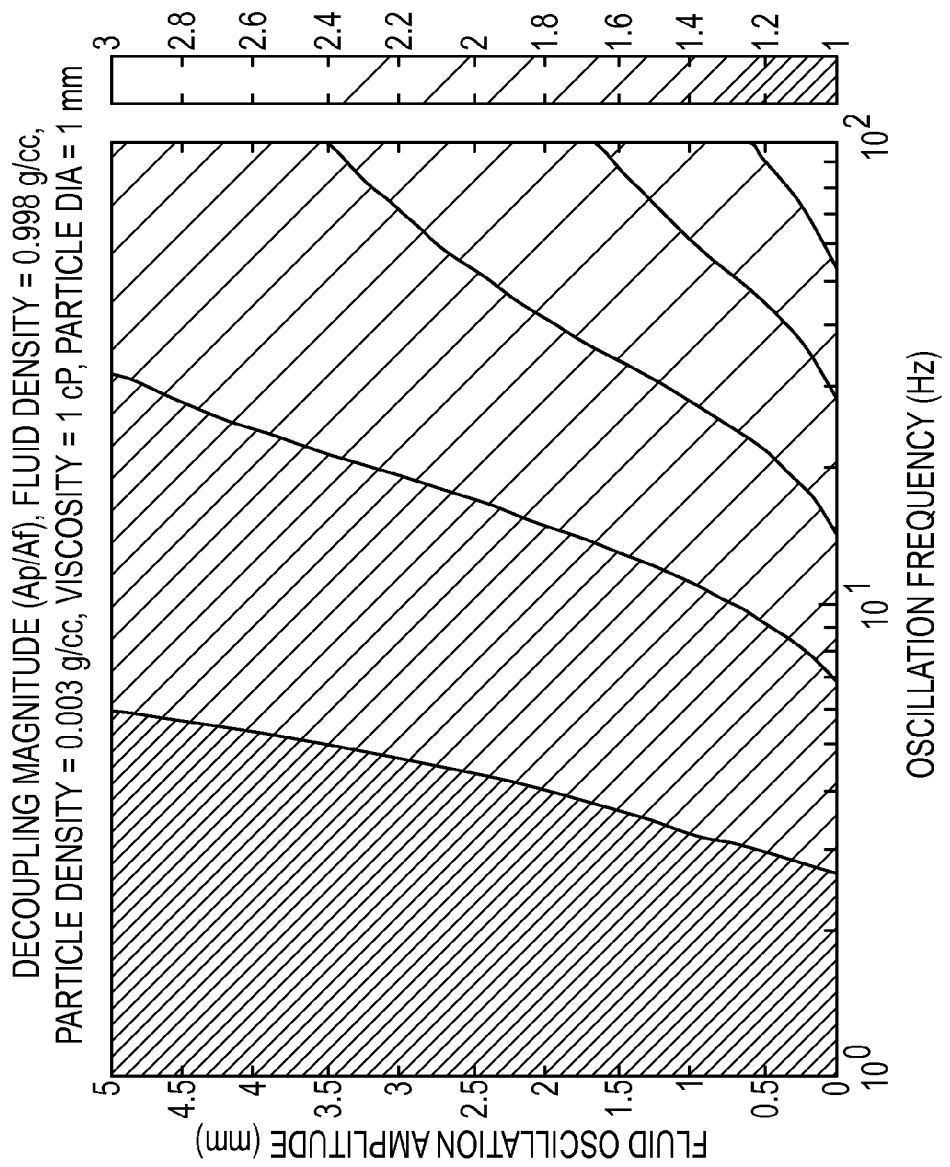
FIG. 3 is a graph of decoupling effect versus frequency for a very low operating frequency, up to 100 Hz in the example shown in the graph.

FIG. 3 is a graph of decoupling effect versus frequency for a range of operating frequencies, up to 100 Hz in the example shown in the graph. The graph shows the decoupling effect versus frequency for a range of vibrational amplitudes. A flow meter operating at less than about 5 to 10 Hz will function desirably because the decoupling ratio will remain at a decoupling ratio of about 1:1, i.e., almost no decoupling will occur. For a very low vibration frequency of 5 Hz or less, it can be seen that the response decoupling magnitude $(A_p/A_f)$ will remain in the darkest region along the left axis of the graph, at around the 1:1 decoupling ratio, as indicated by the scaling bar along the right side of the graph. It can also be seen that the decoupling effect decreases for high vibration amplitudes. As a result, entrained gas bubbles will move with the flow fluid, causing no errors in mass flow or mixture density measurements. Velocity of sound effects will also be negligible for such a low frequency, as SOS/compressibility effects typically do not become apparent until the vibrational frequency exceeds about 200 Hz.

Figure 4:
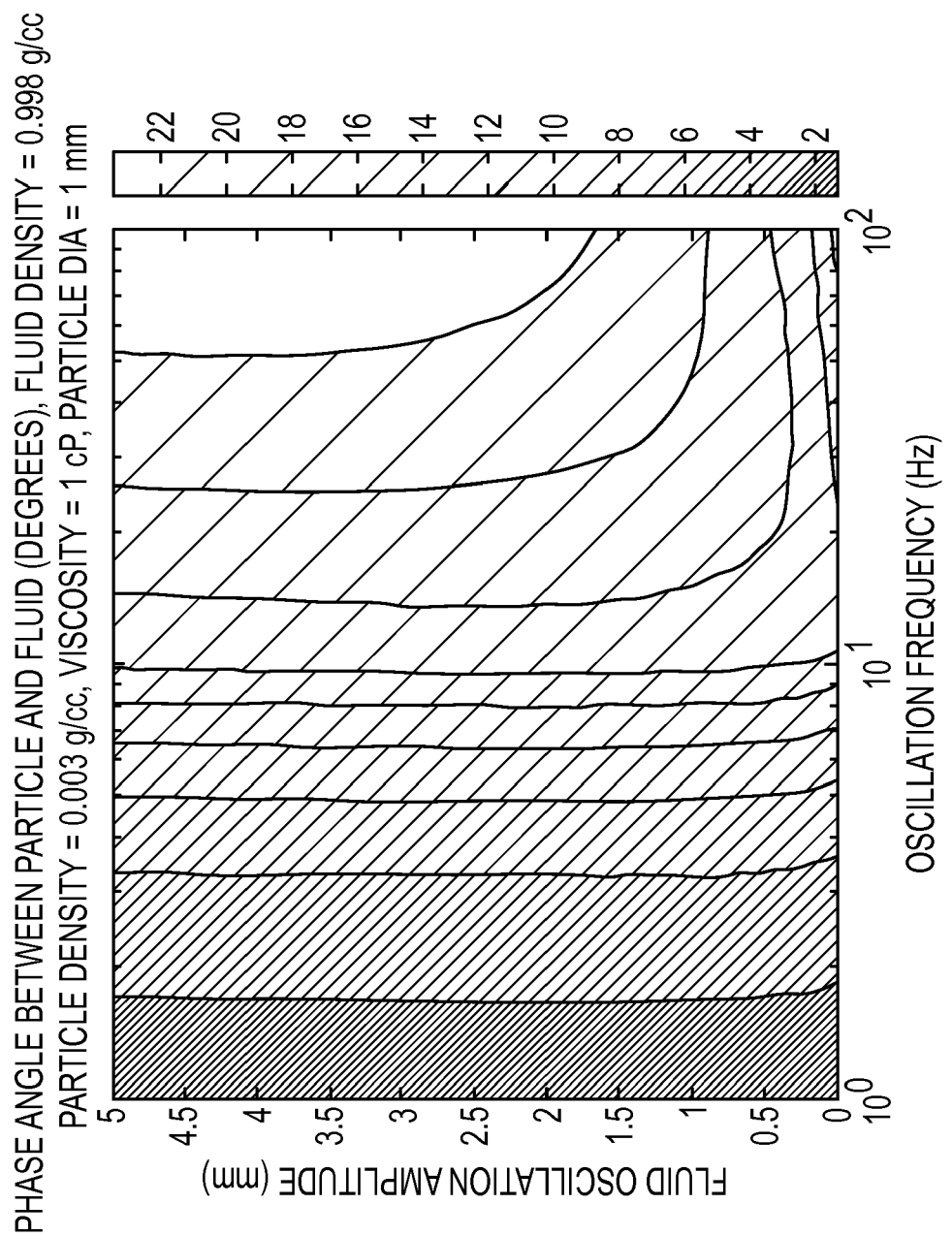
FIG. 4 is a corresponding graph of decoupling phase angle ($\phi$) versus frequency for a very low operating frequency, up to 100 Hz in the example shown in the graph.

FIG. 4 is a corresponding graph of decoupling phase angle ($\phi$) versus frequency for an operating frequency up to 100 Hz in the example shown in the graph. It can be seen from this graph that the decoupling phase angle ($\phi$) remains low when the vibrational frequency does not exceed 5 Hz.

Regardless of fluid oscillation amplitude, particle size, fluid density, particle density, and fluid viscosity, the relative motion between the particle and fluid is non-existent for a very low oscillation frequency. The amplitude ratio (i.e., the decoupling ratio $(A_p/A_f)$) approaches a 1:1 ratio and the decoupling phase angle ($\phi$) approaches zero. Therefore, there is no need to calculate the decoupling ratio $(A_p/A_f)$ or the decoupling phase angle ($\phi$). Further, the result is independent of the process fluid and the piping arrangement. The meter generates accurate and reliable measurements because there is no relative motion between multi-phase components. This is true for slurries, bubbly fluids, emulsions, or any other multi-density composite fluid.

A very low frequency vibratory flow meter such as described above could also be driven in its second, third, or fourth bending modes, without limitation. This is feasible due to starting from the very low (resonant) frequency. Also, a meter can be driven off resonance at any frequency. As discussed above, decoupling worsens with increasing frequency. Therefore, more and more negative error will appear in the density and mass flow measurements as the operating frequency increases.

This fact can be useful as a diagnostic. The meter can be configured to determine whether measurements are affected by SOS or decoupling effects, and at what frequencies the effects become negligible. For example, a flow meter can be driven simultaneously on and off resonance at frequencies of 10, 20, 30, 40, 50, 60, 70, 80, 90, and 100 Hz. For a given flow fluid, measurements at 10, 20, and 30 Hz may all be equivalent, indicating that SOS/decoupling effects do not impact measurements below about 40 Hz. If more gas is entrained or bubble size increases, it may be that only the measurements at 10 and 20 Hz are equivalent, meaning that the decoupling is worse than in the example above and a lower frequency measurement is required. This diagnostic capability can be used to determine the presence of multiple phases or can be used to give the user an indication of the accuracy of the measurements at each frequency.

A primary application of a very low frequency vibratory flow meter may be an upstream (pre-separator) oil and natural gas measurement. Such a multi-phase meter would eliminate the need for a separator, an extremely expensive device. A vibratory flow meter which worked with +/−5% accuracy in this difficult application would be very desirable to the oil and gas community, who want to measure the rough output of each oil well. Another application is in mixing and/or metering cement, where the cement contains rock particles and entrained gas, making it a three phase mixture. With no relative motion between any of the phases at low frequency, the meter would perform as though there was one homogeneous phase and give correct mixture mass flow and density measurements, regardless of the number of components or phases.

While it is possible to drive a meter off-resonance at low frequency, the feasibility of a very low frequency vibratory flow meter driven on resonance may in some respects depend on how long the conduits would have to be in order to reach the desired very low frequency. As an example, for a Micro Motion model E200 Coriolis flow meter that typically vibrates at a 70 Hz frequency for measuring water, the flow conduits extend about 18 inches past the brace bar. As an estimate, consider the equation for frequency of a fixed-free cantilever beam:

$$f = \frac{3.52}{2\pi}\sqrt{\frac{EI}{ml^4}} \quad (1)$$

Where E is the Modulus of Elasticity, I is the moment of inertia of the cross-section, m is the mass per unity length, and l is the length. For a frequency (f) of seventy Hz and a length (L) of eighteen inches, a proportionality constant can be found for the (EI/m) component. As an example, a flow conduit must be about sixty-seven inches in length for an E200 model Coriolis flow meter in order to achieve a five Hz vibrational frequency, without changing the E, I, or m terms.

Another approach is a combination of the previously discussed factors. For example, one solution would be to lengthen the conduits somewhat, decrease wall thickness somewhat, add a little mass near the driver or pickoffs, and/or operate below resonance. Another effective method to reduce frequency would be to allow the conduits to bend into line with the pipeline before the brace bars or even to eliminate the brace bars. This would decrease the stiffness in the drive mode considerably due to an additional torsion component (see FIG. 5).

The very low frequency vibratory flow meter 5 can be designed for a specific application. The very low frequency vibratory flow meter 5 can therefore have a very low operating frequency that achieves a predetermined very low vibrational frequency and very low vibrational response frequency and very high vibrational response amplitude.

The vibrational frequency can be specified in multiple ways. The vibrational frequency can be specified as a frequency threshold or limit. The vibrational frequency can be specified as being below a predetermined decoupling threshold or limit. The vibrational frequency can be specified as being below a predetermined SOS/compressibility threshold or limit. The vibrational frequency can be specified as complying with a predetermined inverse Stokes number threshold or limit (discussed below). For example, the predetermined inverse Stokes number threshold can be chosen to substantially eliminate multi-phase flow errors.

Coriolis mass flow meters and vibratory densitometers require that the flow fluid move with the flow conduits during oscillation at the meter's natural frequency. When foreign material is introduced, this assumption is no longer valid, as there is relative motion or decoupling between the two or more phases. A model has been developed to predict the conditions that are needed for a good mixture density measurement, given specific meter operating conditions. The fluids model, which has been validated experimentally, can predict decoupling effects. The equations to find a decoupling ratio $(A_p/A_f)$ and a decoupling phase angle $(\phi)$ are:

$$m_p \frac{dv}{dt} = F_{drag} + F_{history} + F_{addedmass} + F_{buoyancy} \quad (3)$$

The decoupling ratio $(A_p/A_f)$ comprises the ratio of the particle (i.e., foreign material) amplitude $(A_p)$ versus the flow conduit amplitude $(A_f)$. The particle can comprise any foreign material, including gas bubbles, solid particles, or even portions of a different fluid entrained within the flow fluid. The individual terms of equation (3) are defined as:

$$F_{drag} = 6\pi\mu_f a(u-v)\phi(\text{Re}) \quad (4)$$

$$F_{history} = 6\pi\mu_f a\left(\frac{u-v}{\delta} + \frac{\delta t_v}{2}\frac{d(u-v)}{dt}\right) \quad (5)$$

$$F_{addedmass} = \frac{2}{3}\pi\rho_f a^3\left(\frac{du}{dt} - \frac{dv}{dt}\right) \quad (6)$$

$$F_{buoyancy} = \frac{4}{3}\pi\rho_f a^3\frac{du}{dt} \quad (7)$$

The motion of the flow fluid is assumed to match the motion of the flow conduit. The motion of the bubble or particle is calculated as:

$$\text{Fluid Velocity}=u=A_f\cos(\omega t) \quad (8)$$

$$\text{Particle Velocity}=v=A_p\cos(\omega t+\phi) \quad (9)$$

The above equations can be used to find particle motion in the oscillating environment of a vibratory flow meter to within about plus or minus ten percent accuracy for the vibrational amplitude and phase difference in most situations.

The six inputs needed to solve the above equations for bubble motion are: the vibrational response frequency (f), the vibrational response amplitude ($A_f$), the fluid density ($\rho_f$), the particle density ($\rho_p$) of the foreign material particles entrained in the flow fluid, the dynamic flow fluid viscosity ($\mu_f$), and the particle radius distribution (a) of the foreign material entrained in the flow fluid. The vibrational response frequency (f) and the vibrational response amplitude ($A_f$) can be determined from the vibrational response of the one or more flow conduits (103A, 103B), such as from the vibrational response signal generated by the pick-offs (105, 105'). The fluid density ($\rho_f$) may be specified by a customer, such as in the case of a known flow fluid, or can be obtained by measurement. The particle density ($\rho_p$) may be specified by a customer or alternatively may be determinable from the ideal gas law in the case of entrained gas, given a measured temperature and pressure of the flow fluid. The dynamic viscosity ($\mu_f$) may be specified by a customer, such as in the case of a known flow fluid, or can be obtained by measurement. The particle size distribution (a) may be specified by a customer, such as in the case of a known flow fluid, or can be obtained by measurement, including acoustic or radiation measurements of foreign material particles or bubbles in the flow fluid.

Figure 5:
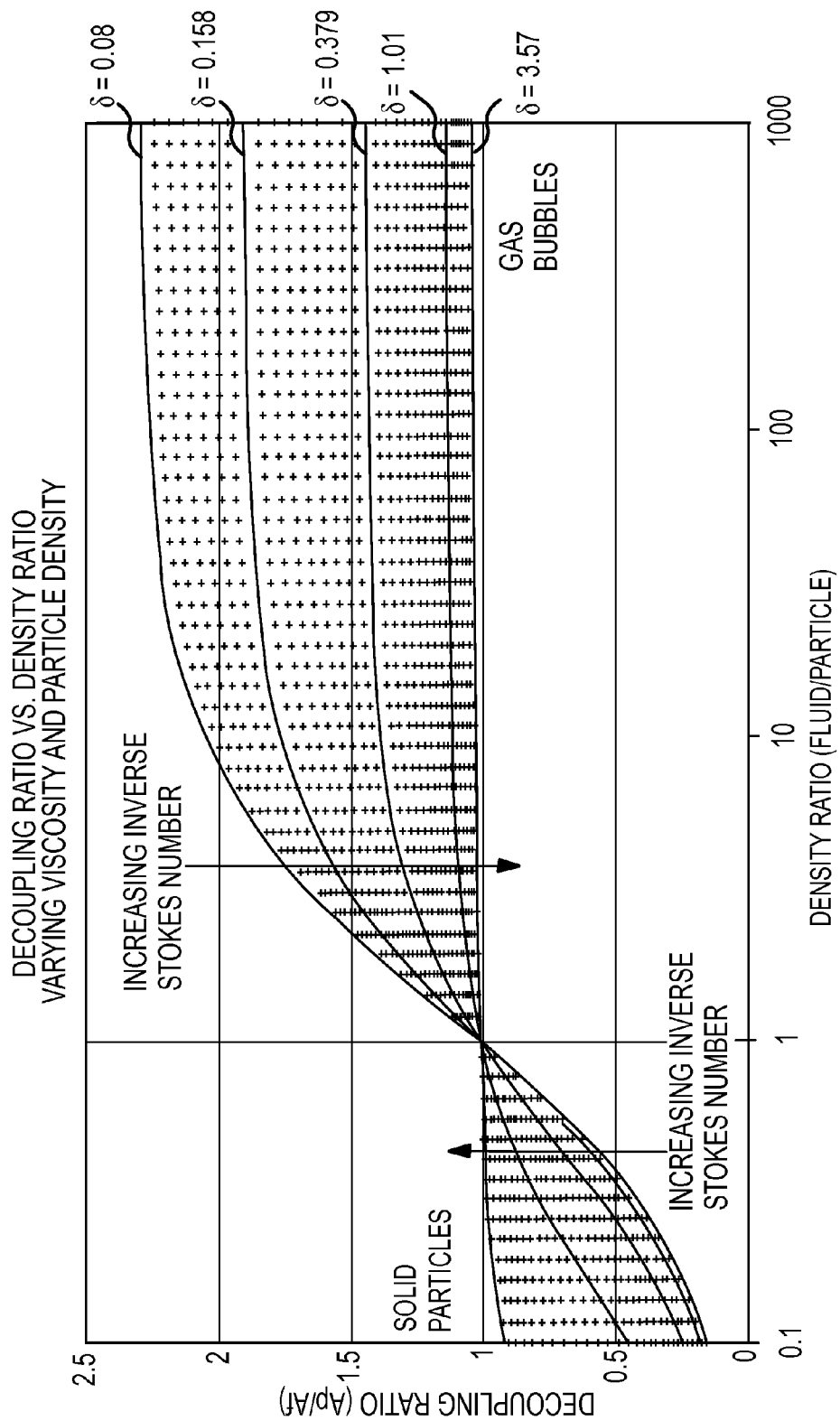
FIG. 5 is a graph of decoupling ratio versus density ratio for the very low frequency vibratory flow meter according to the invention.

FIG. 5 is a graph of decoupling ratio versus density ratio for the very low frequency vibratory flow meter according to the invention. The graph further includes results for various inverse Stokes numbers ($\delta$). The inverse Stokes number ($\delta$) can be used to more succinctly characterize the conditions for avoiding frequency-related decoupling and SOS/compressibility effects.

The graph shows five different inverse Stokes numbers ($\delta$) and the resulting decoupling ratios. It can be seen from the graph that entrained gas and entrained solids react oppositely in terms of decoupling, with the entrained gases exhibiting greater motion than the bulk fluid and solid particles exhibiting less motion. Regardless, the ideal situation is when all phases inside the flow conduit move at exactly the same amplitude and phase (i.e., where Ap/Af=1). It can also be seen that as gas bubble size increases, the amount of decoupling increases. Solid particle decoupling also moves away from the ideal case of 1:1 motion when solid particle size increases.

The inverse Stokes number ($\delta$) comprises:

$$\delta = \sqrt{\frac{2\eta}{\omega a^2}} \quad (2)$$

The inverse Stokes number ($\delta$) takes into account the flow fluid kinematic viscosity ($\eta$), the angular vibrational frequency ($\omega$), and the particle or bubble radius (a) of the foreign material. The kinematic viscosity ($\eta$) comprises the dynamic viscosity ($\mu$) divided by the density ($\rho$) of the fluid, i.e., $\eta=\mu/\rho$. The foreign material can include entrained gas or entrained solids, as previously discussed. The inverse Stokes number ($\delta$) therefore may be used to more completely and accurately determine an upper vibrational frequency limit than is possible through just a frequency specification.

Increasing the inverse Stokes number ($\delta$) moves the decoupling ratio ($A_p/A_f$) closer to unity, indicating a reduction in relative motion. As the density ratio increases past about 50, the decoupling ratio is dependent primarily on the inverse Stokes number ($\delta$). This is especially important because all gas/liquid mixtures have high density ratios, usually above 100. Thus, for the most common multiphase flow conditions in a vibratory flow meter, the extent of measurement error depends primarily on the inverse Stokes number ($\delta$). If this parameter is very small, the result approaches the inviscid case of a 3:1 decoupling ratio, while if the parameter is large, relative motion is restricted and the decoupling ratio approaches 1:1. The inverse Stokes number ($\delta$) illustrates that the balance between fluid kinematic viscosity, particle size, and frequency is important, not any one of these variables alone. However, frequency is controlled by meter design characteristics, while viscosity and particle or bubble size depend on complex and often uncontrollable process conditions.

The inverse Stokes number ($\delta$) in some embodiments comprises a number above about 3.5. The inverse Stokes number ($\delta$) in some embodiments comprises a number above about 1.0. The inverse Stokes number ($\delta$) in some embodiments comprises a number above about 0.5.

In some embodiments, the very low frequency vibratory flow meter 5 can be designed to operate at a vibrational response frequency of up to about 5 Hz. In some embodiments, the very low frequency vibratory flow meter 5 can be designed to operate at a vibrational response frequency of up to about 10 Hz. In some embodiments, the very low frequency vibratory flow meter 5 can be designed to operate at a vibrational response frequency of up to about 20 Hz. In some embodiments, the very low frequency vibratory flow meter 5 can be designed to operate at a vibrational response frequency of up to about 30 Hz. In some embodiments, the very low frequency vibratory flow meter 5 can be designed to operate at a vibrational response frequency of up to about 40 Hz. In some embodiments, the very low frequency vibratory flow meter 5 can be designed to operate at a vibrational response frequency of up to about 49 Hz. Desired bending mode frequencies may be reached through meter design considerations, or alternatively through off-resonant vibration at a specified frequency.

In some embodiments, the very low frequency vibratory flow meter 5 can be designed to operate at a vibrational response amplitude of above about 1 mm. In some embodiments, the very low frequency vibratory flow meter 5 can be designed to operate at a vibrational response amplitude of above about 2 mm. In some embodiments, the very low frequency vibratory flow meter 5 can be designed to operate at a vibrational response amplitude of above about 5 mm. In some embodiments, the very low frequency vibratory flow meter 5 can be designed to operate at a vibrational response amplitude of above about 10 mm.

FIG. 6 shows a portion of the very low frequency vibratory flow meter 5 according to the invention. This figure shows the flow meter 5 employing a large height-to-length aspect ratio (H/L) according to some embodiments of the invention. The large height-to-length aspect ratio (H/L) lowers the flow meter stiffness and the flow meter operating frequency.

In addition, the figure shows a change in the vibrational node positions. The dashed lines in the figure show typical brace bars 120 and 120'. Brace bars are commonly employed to fix bending nodes and establish a bending axis. Brace bars fix the flow conduits in relation to each other, where two flow conduits are employed, and form a vibrational bending node. The brace bars 120 and 120' establish a bending axis W-W, where only the flow conduit portions above the bending axis W-W are allowed to vibrate. The bending axis W-W restricts the vibrational frequency and typically keeps the frequency high.

In order to modify the operating frequency, the bending axis location can be moved. Consequently, the operating frequency can be reduced by an appropriate bending axis location, such as by appropriately locating vibrational node positions. In some embodiments, this can be accomplished by moving the brace bars, as shown by brace bars 122 and 122' in the figure. The brace bars 122 and 122' establish the bending axis W"-W". In other embodiments, this can be accomplished by eliminating the brace bars altogether. In such embodiments, the bending axis can be determined by the flanges 101 and 101' or can be accomplished by the manifolds 102 and 102'. It should be noted that these are only two possible methods for lowering frequency through flow conduit geometry modifications. Other methods are contemplated and are within the scope of the description and claims.

Figure 7:
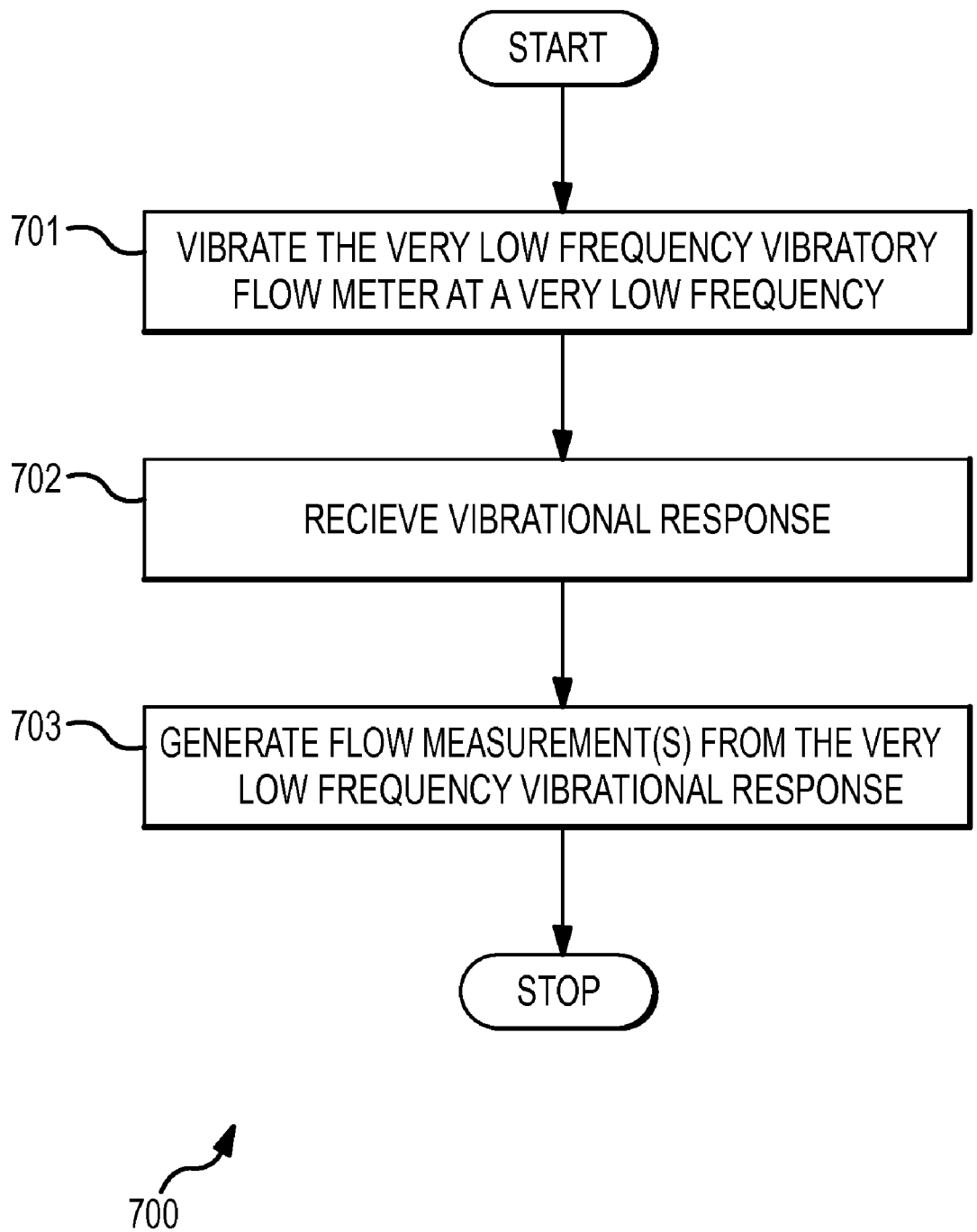
FIG. 7 is a flowchart of a method of operating a very low frequency vibratory flow meter according to the invention.

FIG. 7 is a flowchart 700 of a method of operating a very low frequency vibratory flow meter according to the invention. In step 701, the flow meter is vibrated at a very low frequency. The very low frequency can include a frequency below about 50 Hertz (Hz). The very low frequency can include a frequency below about 5 Hertz (Hz), in some embodiments. Other very low frequencies are contemplated and are within the scope of the description and claims.

The very low frequency can include a frequency where a decoupling ratio $(A_p/A_f)$ of about 1:1 is achieved for a specific application or for a majority of applications; including those with entrained gas or solid particles. The very low frequency can include a frequency such that an effective viscosity approaching infinity is achieved for the flow fluid. The very low frequency can be below a predetermined minimum decoupling frequency, independent of a foreign material size or a foreign material composition. The very low frequency therefore avoids decoupling effects and the entrained foreign material moves substantially with the flow fluid. The very low frequency can be below a predetermined minimum SOS/compressibility threshold, independent of a foreign material size or a foreign material composition. The very low frequency therefore avoids SOS/compressibility effects, which do not appear until higher frequencies are achieved.

One or more flow conduits of the very low frequency vibratory flow meter are configured to achieve the very low frequency by configuration of one or more of a flow conduit stiffness, flow conduit length, flow conduit aspect ratio, flow conduit material, flow conduit thickness, flow conduit shape, flow conduit geometry, or one or more vibrational node positions, as previously discussed. Alternatively, the one or more flow conduits may be driven off-resonance at a predetermined low frequency, lower than the resonant frequency, as previously discussed.

In step 702, a vibrational response of the flow meter assembly is received. The vibrational response can be used to determine a resulting frequency and amplitude, including a frequency that can comprise a resonant frequency for the flow fluid.

In step 703, one or more flow measurements can be generated from the very low frequency vibrational response. The one or more flow measurements can include a mass flow rate. The one or more flow measurements can include a density. A density measurement using the very low frequency can be determined with assumptions as to the decoupling ratio and the fluid viscosity. Other flow measurements are contemplated and are within the scope of the description and claims.

Decoupling is, in general, a complicated function of many input parameters, which makes it very difficult to compensate for in flow meter measurements. However, it has been found that the decoupling effect is negligible for small gas bubbles. Similarly, where the flow fluid is highly viscous, the decoupling may not occur or may only occur with very high vibrational frequencies. Further, in an entrained gas scenario, if the foreign material is mixed well with the flow fluid, decreasing the bubble size and/or evenly distributing the gas, then the decoupling can be reduced or effectively eliminated in some cases. Also, a high flow fluid viscosity reduces or eliminates decoupling and increases measurement accuracy. However, the characteristics of the flow fluid may be fixed in nature and the bubble size and viscosity may have to be accepted as-is.

A very low frequency vibratory flow meter can be designed to be substantially immune from multi-phase effects, including both SOS/compressibility effects and decoupling effects. Of course, where the volume of entrained foreign material gets large enough, even a very low frequency vibratory flow meter may suffer some effects, but a very low frequency flow meter will still exhibit much greater accuracy and reliability than moderate or high frequency prior art vibratory flow meters.

What is claimed is:

1. A very low frequency vibratory flow meter (100), comprising:
   a flow meter assembly (10) including one or more flow conduits (103A, 103B), with the flow meter assembly (10) being configured to generate a very low frequency vibrational response that is below a predetermined minimum decoupling frequency for the flow fluid independent of a foreign material size or a foreign material composition; and
   meter electronics (20) coupled to the flow meter assembly (10) and configured to receive the very low frequency vibrational response and generate one or more flow measurements therefrom.

2. The very low frequency vibratory flow meter (100) of claim 1, wherein the very low frequency vibrational response is below a predetermined minimum SOS/compressibility threshold independent of a foreign material size or a foreign material composition.

3. The very low frequency vibratory flow meter (100) of claim 1, wherein the meter electronics (20) is configured such that a decoupling ratio $(A_p/A_f)$ is about 1:1 for entrained solids or entrained gas at the very low frequency.

4. The very low frequency vibratory flow meter (100) of claim 1, wherein the meter electronics (20) is configured such that a viscosity is effectively infinity with regard to particle motion for the flow fluid at the very low frequency.

5. The very low frequency vibratory flow meter (100) of claim 1, with the very low frequency vibrational response being below about 5 Hertz (Hz).

6. The very low frequency vibratory flow meter (100) of claim 1, with the very low frequency vibrational response being below about 50 Hertz (Hz).

7. The very low frequency vibratory flow meter (100) of claim 1, with the very low frequency vibrational response corresponding to an inverse Stokes number (8) that is above about 3.5.

8. The very low frequency vibratory flow meter (100) of claim 1, with the one or more flow conduits (103A, 103B) being configured to vibrate at a very high vibrational response amplitude.

9. The very low frequency vibratory flow meter (100) of claim 1, with the one or more flow conduits (103A, 103B) being configured to vibrate at a vibrational response amplitude of greater than about one millimeter (mm).

10. The very low frequency vibratory flow meter (100) of claim 1, with the one or more flow conduits (103A, 103B) being configured to vibrate at a vibrational response amplitude of greater than about five millimeters (mm).

11. The very low frequency vibratory flow meter (100) of claim 1, wherein the one or more flow conduits (103A, 103B) are configured to achieve the very low frequency vibrational response by configuration of one or more of a flow conduit stiffness, flow conduit length, flow conduit aspect ratio, flow conduit material, flow conduit thickness, flow conduit shape, flow conduit geometry, or one or more vibrational node positions.

12. The very low frequency vibratory flow meter (100) of claim 1, wherein the very low frequency vibratory flow meter (100) is excited off-resonance at a predetermined low frequency and an off-resonance mass flow measurement is obtained, wherein the off-resonance mass flow measurement is substantially immune to decoupling and SOS effects.

13. The very low frequency vibratory flow meter (100) of claim 12, wherein the predetermined low frequency is chosen to correspond to an inverse Stokes number ($\delta$) greater than a threshold value selected to substantially eliminate multi-phase errors.

14. The very low frequency vibratory flow meter (100) of claim 12, wherein the off-resonance mass flow measurement is compared with a resonance mass flow measurement obtained at a resonant frequency and if the off-resonance mass flow measurement and the resonance mass flow measurement differ by more than a predetermined decoupling range, a multi-phase indication is generated.

15. The very low frequency vibratory flow meter (100) of claim 12, wherein the very low frequency vibratory flow meter (100) is excited off-resonance at multiple predetermined off-resonance frequencies and multiple corresponding off-resonance mass flow measurements are obtained, wherein the multiple off-resonance mass flow measurements are compared to determine whether a multi-phase flow exists and to determine a multi-phase error magnitude.

16. A method of operating a very low frequency vibratory flow meter, the method comprising:
   vibrating one or more flow conduits of the very low frequency vibratory flow meter at a very low frequency that is below a predetermined minimum decoupling frequency for the flow fluid independent of a foreign material size or a foreign material composition;
   receiving a very low frequency vibrational response; and
   generating one or more flow measurements from the very low frequency vibrational response.

17. The method of claim 16, wherein the very low frequency vibrational response is below a predetermined minimum SOS/compressibility threshold independent of a foreign material size or a foreign material composition.

18. The method of claim 16, wherein very low frequency vibratory flow meter is configured such that a decoupling ratio ($A_p/A_f$) is about 1:1 for entrained solids or entrained gas at the very low frequency.

19. The method of claim 16, wherein the very low frequency vibratory flow meter is configured such that a viscosity is effectively infinity with regard to particle motion for the flow fluid at the very low frequency.

20. The method of claim 16, with the very low frequency vibrational response being below about 5 Hertz (Hz).

21. The method of claim 16, with the very low frequency vibrational response being below about 50 Hertz (Hz).

22. The method of claim 16, with the very low frequency vibrational response corresponding to an inverse Stokes number ($\delta$) that is above about 3.5.

23. The method of 16, with the one or more flow conduits being configured to vibrate at a very high vibrational response amplitude.

24. The method of claim 16, with the one or more flow conduits being configured to vibrate at a vibrational response amplitude of greater than about one millimeter (mm).

25. The method of claim 16, with the one or more flow conduits being configured to vibrate at a vibrational response amplitude of greater than about five millimeters (mm).

26. The method of claim 16, wherein the one or more flow conduits are configured to achieve the very low frequency vibrational response by configuration of one or more of a flow conduit stiffness, flow conduit length, flow conduit aspect ratio, flow conduit material, flow conduit thickness, flow conduit shape, flow conduit geometry, or one or more vibrational node positions.

27. The method of claim 16, wherein the very low frequency vibratory flow meter is excited off-resonance at a predetermined low frequency and an off-resonance mass flow measurement is obtained, wherein the off-resonance mass flow measurement is substantially immune to decoupling and SOS effects.

28. The method of claim 27, wherein the predetermined low frequency is chosen to correspond to an inverse Stokes number ($\delta$) greater than a threshold value selected to substantially eliminate multi-phase errors.

29. The method of claim 27, wherein the off-resonance mass flow measurement is compared with a resonance mass flow measurement obtained at a resonant frequency and if the off-resonance mass flow measurement and the resonance mass flow measurement differ by more than a predetermined decoupling range, a multi-phase indication is generated.

30. The method of claim 27, wherein the very low frequency vibratory flow meter is excited off-resonance at multiple predetermined off-resonance frequencies and multiple corresponding off-resonance mass flow measurements are obtained, wherein the multiple off-resonance mass flow measurements are compared to determine whether a multi-phase flow exists and to determine a multi-phase error magnitude.

31. A method of forming a very low frequency vibratory flow meter, the method comprising:
   determining a predetermined very low operating frequency for the very low frequency vibratory flow meter based on at least an expected flow fluid, where the very low operating frequency is below a predetermined minimum decoupling frequency for the flow fluid independent of a foreign material size or a foreign material composition;
   selecting one or more flow conduit design characteristics based on the predetermined very low operating frequency, with the one or more flow conduit design characteristics being selected to substantially achieve the predetermined very low operating frequency; and
   constructing the very low frequency vibratory flow meter employing the selected one or more flow conduit design characteristics.

32. The method of claim 31, wherein the very low frequency vibrational response is below a predetermined minimum decoupling frequency for the flow fluid independent of a foreign material size or a foreign material composition.

33. The method of claim 31, wherein the flow meter is configured such that a decoupling ratio ($A_p/A_f$) is about 1:1 for entrained solids or entrained gas at the very low frequency.

34. The method of claim 31, wherein the flow meter is configured such that a viscosity is effectively infinity with regard to particle motion for the flow fluid at the very low frequency.

35. The method of claim 31, wherein the very low frequency vibrational response is below a predetermined minimum SOS/compressibility threshold independent of a foreign material size or a foreign material composition.

36. The method of claim 31, with the very low frequency vibrational response being below about 5 Hertz (Hz).

37. The method of claim 31, with the very low frequency vibrational response being below about 50 Hertz (Hz).

38. The method of claim 31, with the very low frequency vibrational response corresponding to an inverse Stokes number ($\delta$) that is above about 3.5.

39. The method of claim 31, with the one or more flow conduits being configured to vibrate at a very high vibrational response amplitude.

40. The method of claim 31, with the one or more flow conduits being configured to vibrate at a vibrational response amplitude of greater than about one millimeter (mm).

41. The method of claim 31, with the one or more flow conduits being configured to vibrate at a vibrational response amplitude of greater than about five millimeters (mm).

42. The method of claim 31, wherein the one or more flow conduits are configured to achieve the very low frequency vibrational response by configuration of one or more of a flow conduit stiffness, flow conduit length, flow conduit aspect ratio, flow conduit material, flow conduit thickness, flow conduit shape, flow conduit geometry, or one or more vibrational node positions.

43. The method of claim 31, wherein the very low frequency vibratory flow meter is excited off-resonance at a predetermined low frequency and an off-resonance mass flow measurement is obtained, wherein the off-resonance mass flow measurement is substantially immune to decoupling and SOS effects.

44. The method of claim 43, wherein the predetermined low frequency is chosen to correspond to an inverse Stokes number ($\delta$) greater than a threshold value selected to substantially eliminate multi-phase errors.

45. The method of claim 43, wherein the off-resonance mass flow measurement is compared with a resonance mass flow measurement obtained at a resonant frequency and if the off-resonance mass flow measurement and the resonance mass flow measurement differ by more than a predetermined decoupling range, a multi-phase indication is generated.

46. The method of claim 43, wherein the very low frequency vibratory flow meter is excited off-resonance at multiple predetermined off-resonance frequencies and multiple corresponding off-resonance mass flow measurements are obtained, wherein the multiple off-resonance mass flow measurements are compared to determine whether a multi-phase flow exists and to determine a multi-phase error magnitude.

* * * * *